(12) United States Patent
Power

(10) Patent No.: US 12,599,982 B1
(45) Date of Patent: *Apr. 14, 2026

(54) METHOD OF BRAZING GOLF CLUB COMPONENTS

(71) Applicant: Callaway Golf Company, Carlsbad, CA (US)

(72) Inventor: Alex Power, Carlsbad, CA (US)

(73) Assignee: Topgolf Callaway Brands Corp., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,031

(22) Filed: Jul. 14, 2023

Related U.S. Application Data

(60) Provisional application No. 63/390,319, filed on Jul. 19, 2022.

(51) Int. Cl.
| | |
|---|---|
| *B23K 1/00* | (2006.01) |
| *B23K 1/008* | (2006.01) |
| *B23K 1/14* | (2006.01) |
| *B23K 1/20* | (2006.01) |
| B23K 101/04 | (2006.01) |
| B23K 103/02 | (2006.01) |
| B23K 103/14 | (2006.01) |

(52) U.S. Cl.
CPC ............ *B23K 1/0008* (2013.01); *B23K 1/008* (2013.01); *B23K 1/14* (2013.01); *B23K 1/203* (2013.01); *B23K 2101/04* (2018.08); *B23K 2103/02* (2018.08); *B23K 2103/14* (2018.08)

(58) Field of Classification Search
None
See application file for complete search history.

(56) References Cited

U.S. PATENT DOCUMENTS 3,197,859 A * 8/1965 Cape ................... B23K 35/302
  228/249
4,465,221 A * 8/1984 Schmidt ................ B23K 33/00
  228/125

(Continued)

FOREIGN PATENT DOCUMENTS

CN      102319966 A  *  1/2012
CN      104191105 A  *  12/2014   ......... B23K 35/3006

(Continued)

OTHER PUBLICATIONS

Elrefaey et al. "Brazing of titanium to steel with different filler metals: analysis and comparison", J Mater Sci (2010) 45:4332-4338 DOI 10.1007/s10853-010-4357-z (Year: 2010).*

(Continued)

*Primary Examiner* — Keith Walker
*Assistant Examiner* — Carlos J Gamino
(74) *Attorney, Agent, or Firm* — Michael A. Catania

(57) ABSTRACT

A method of brazing golf club components composed of dissimilar materials, and particularly titanium and steel materials, is disclosed herein. The method includes the steps of preparing surfaces of the components for brazing, applying to at least one of the surfaces a nickel-based filler, fixturing each of the first and second golf club components within a vacuum brazing furnace so that the surfaces face one another, and performing at least one brazing cycle within the vacuum brazing furnace.

1 Claim, 8 Drawing Sheets

(56)     References Cited

U.S. PATENT DOCUMENTS

| | | | | | |
|---|---|---|---|---|---|
| 4,684,052 | A | * | 8/1987 | McDonald | C04B 37/026 |
| | | | | | 228/122.1 |
| 4,729,504 | A | * | 3/1988 | Edamura | C04B 37/026 |
| | | | | | 228/248.1 |
| 5,871,408 | A | * | 2/1999 | Chen | A63B 60/00 |
| | | | | | 473/409 |
| 6,605,371 | B1 | * | 8/2003 | Ueda | B23K 35/3033 |
| | | | | | 428/677 |
| 2004/0058744 | A1 | * | 3/2004 | Solheim | A63B 53/0487 |
| | | | | | 473/341 |
| 2005/0261081 | A1 | * | 11/2005 | Chen | A63B 53/0466 |
| | | | | | 473/345 |
| 2008/0029496 | A1 | * | 2/2008 | Lin | B23K 1/0056 |
| | | | | | 219/121.64 |
| 2010/0056298 | A1 | * | 3/2010 | Jertson | A63B 60/00 |
| | | | | | 228/101 |
| 2010/0237136 | A1 | * | 9/2010 | De La Cruz | B23K 1/0008 |
| | | | | | 228/164 |
| 2020/0189983 | A1 | * | 6/2020 | Le Boudouil | B23K 1/0008 |

FOREIGN PATENT DOCUMENTS

| | | | | | |
|---|---|---|---|---|---|
| JP | 62072498 | A | * | 4/1987 | |
| JP | 2005103019 | A | * | 4/2005 | B23K 1/0008 |

OTHER PUBLICATIONS

Kumar et al. "Vacuum brazed joints of titanium alloy with low temperature filler metal", AIP Conf. Proc. 2247, 050011 (2020) https://doi.org/10.1063/5.0004489 (Year: 2020).*

El Refaey et al. "Characterization of Titanium/Steel Joints Brazed in Vacuum", Welding Journal, May 2008 (Year: 2008).*

Jfgbrazing.com, "Ten steps for a successful brazing operation", Sep. 18, 2015, https://jfdbrazing.com/ ten-steps-for-a-successful-brazing-operation/ (Year: 2015).*

* cited by examiner

100

METHOD OF BRAZING GOLF CLUB COMPONENTS

CROSS REFERENCES TO RELATED APPLICATIONS

The Present Application claims priority to U.S. Provisional Patent Application No. 63/390,319, filed on Jul. 19, 2022, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to methods of brazing golf club components made of dissimilar materials, and particularly titanium and steel, to one another.

Description of the Related Art

The prior art discloses various means of affixing golf club components made of dissimilar materials to one another. Titanium brazing is done in a vacuum furnace under hard vacuum or partial pressure. Steel brazing can be done in air with flux or in a vacuum furnace under hard vacuum or partial pressure. Joining titanium and steel is difficult because they cannot form a strong bond under typical processes such as welding. Brazing offers a solution to join these dissimilar materials, but the typical material used for this process is silver, which is very expensive. Therefore, there remains a need for an efficient and cost-effective method of joining titanium components to steel components.

BRIEF SUMMARY OF THE INVENTION

The present invention provides an effective method to join titanium and its alloys to iron alloys cost effectively.

The present invention is a method of joining two golf club components using a brazing material composed of a nickel based material and/or a copper based material.

One aspect of the present invention is a method for joining golf club head components. The method includes applying a nickel-based filler material to an attachment surface of a first component of the golf club head composed of a first material to create a nickel-based filler material attachment surface of the first component of the golf club head. The method also includes applying the nickel-based filler material to an attachment surface of a second component of the golf club head composed of a second material to create a nickel-based filler material attachment surface of the second component of the golf club head, wherein the second material is different from the first material. The method also includes fixturing, within a vacuum brazing furnace, the nickel-based filler material attachment surface of the first golf club component to face the nickel-based filler material attachment surface of the second golf club component. The method also includes performing at least one brazing cycle within the vacuum brazing furnace to braze the first component to the second component.

Another aspect of the present invention is a method for joining golf club head components. The method includes applying a copper-based filler material to an attachment surface of a first component of the golf club head composed of a first material to create a copper-based filler material attachment surface of the first component of the golf club head. The method also includes applying the copper-based filler material to an attachment surface of a second component of the golf club head composed of a second material to create a copper-based filler material attachment surface of the second component of the golf club head, wherein the second material is different from the first material. The method also includes fixturing, within a vacuum brazing furnace, the nickel-based filler material attachment surface of the first golf club component to face the nickel-based filler material attachment surface of the second golf club component. The method also includes performing at least one brazing cycle within the vacuum brazing furnace to braze the first component to the second component.

Yet another aspect of the present invention is a method comprising a first step of providing a first golf club component composed of a first material, the first golf club component comprising a first attachment surface, a second step of providing a second golf club component composed of a second material that differs from the first material, the second golf club component comprising a second attachment surface, a third step of preparing each of the first and second attachment surface for brazing, a fourth step of applying to at least one of the first and second attachment surfaces a nickel-based filler, a fifth step of fixturing each of the first and second golf club components within a vacuum brazing furnace so that the first and second attachment surfaces face one another, and a sixth step of performing at least one brazing cycle within the vacuum brazing furnace.

In some embodiments, the first material may be selected from the group consisting of titanium and titanium alloy. In a further embodiment, the method may further comprise the step of wetting the first attachment surface, and the step of wetting the first attachment surface may occur between the third step and the fourth step. In another embodiment, the second material may be a steel material. In any of the embodiments, the nickel-based filler may be BNi-2, BNi-7, or BNi-9. In any of the embodiments, the first component may be a face component composed of a titanium alloy and the second component may be a body component composed of a steel material. In some embodiments, the face component may be a wood-type golf club face component and the body component may be a wood-type golf club body component. In other embodiments, the face component may be an iron-type golf club face component and the body component may be an iron-type golf club body component.

In still other embodiments, third step may comprise cleaning the first and second attachment surfaces. In any of the embodiments, the sixth step may comprise a short brazing cycle. In some embodiments, the first component may be a weight composed of a tungsten alloy material, and the second component may be a body component composed of a steel material. In a further embodiment, the nickel-based filler may be selected from the group consisting of BNi-2, BNi-7, and BNi-9. In other embodiments, the steel material may be a stainless steel. In still other embodiments, the body component may be selected from the group consisting of an iron-type golf club body and a wood-type golf club body.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

Figure 1:
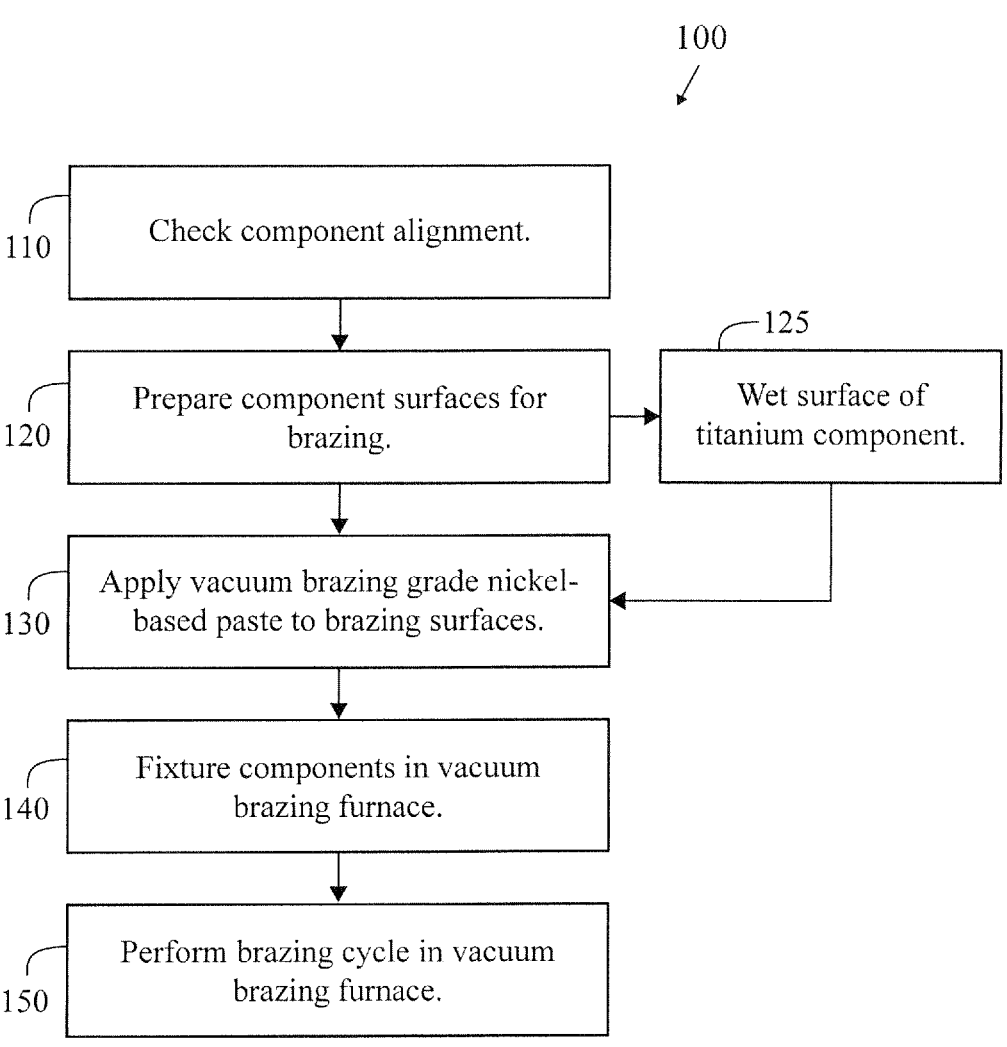
FIG. 1 is a process flow chart illustrating a method for joining golf club head components.

A flow chart of a method 100 for joining golf club components through brazing is shown in FIG. 1. In a first step 110, components 10, 20 made of dissimilar materials, such as titanium alloys and steel alloys, are aligned to ensure proper connectivity. In a second step 120, the components 10, 20 are prepared for brazing, preferably by cleaning their surfaces 12, 22 and removing oxide layers by blasting, wire brush, or any means known to a person skilled in the art. In a third step 130, a nickel-based filler 30 such as BNi-2, BNi-7, or BNi-9 is applied to the surfaces 12, 22 of the components. The nickel-based filler 30 does not have any low vaporization elements, so a hard vacuum can be used to conduct brazing, and nickel is about 20% of the price of silver so is much more cost effective for use in manufacturing. Nickel is soluble into titanium, so the surface of the titanium component 10 may be wetted in an intermediate step 125 between the second and third steps 120, 130. Nickel-based fillers 30 can also be used for steel and stainless-steel brazing. In a fourth step 140, the components 10, 20 are fixtured within a vacuum brazing furnace, and in a fifth step 150 a brazing cycle is performed to permanently affix the components together. It is preferable for the brazing cycle to be short so that the materials are heated and cooled quickly, thereby causing less beta phase to form on titanium (particularly 6-4) components.

In a preferred embodiment, the copper-based filler is selected from the group consisting of copper and a copper alloy (67.5% Cu/23.5% Mn/9% Ni) composed of copper, manganese and nickel.

Figure 2:
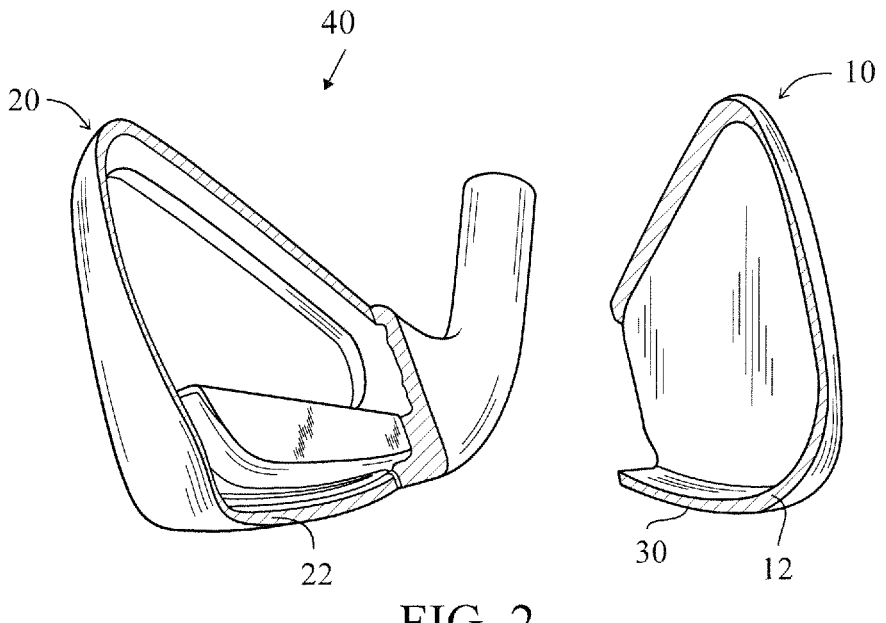
FIG. 2 is an exploded image of first embodiment of a golf club head with components joined by brazing.

An exemplary golf club 40 made up of components 10, 20 made of dissimilar materials and assembled using the method described above is illustrated in FIG. 2. In this embodiment, the body component 20 is composed of a steel material and the face component is composed of a titanium alloy material, preferably 6-4 titanium. Steel, when described herein, may include all steel variants, including stainless steel. Titanium, when described herein, may refer to pure titanium and titanium alloy may refer to all titanium alloys known to a person of ordinary skill in the art.

Figure 3:
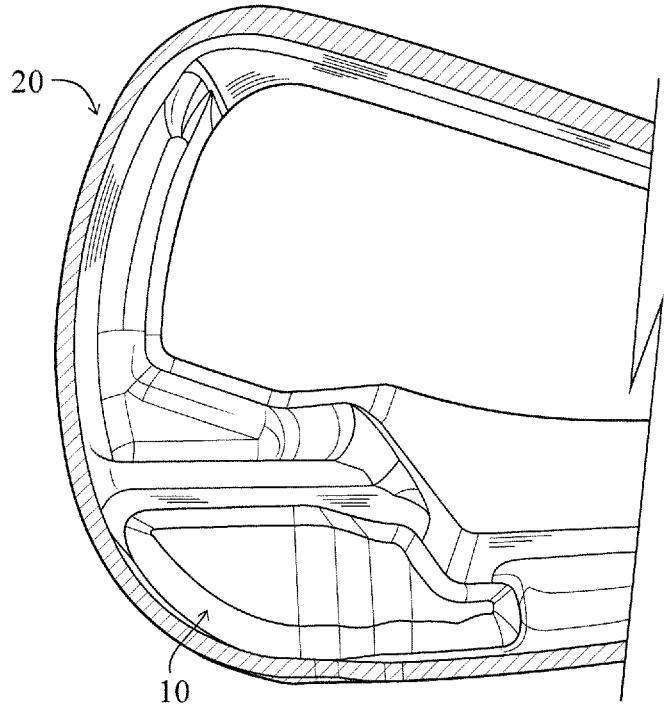
FIG. 3 is an image of a second embodiment of a golf club head with components joined by brazing.

In another embodiment of the present invention, the golf club head illustrated in FIG. 3 is assembled using the preferred method 100 described above. In this embodiment, the component 10 is a tungsten or tungsten alloy weight piece that is affixed as described above to the body 20 of a golf club head.

Figure 4:
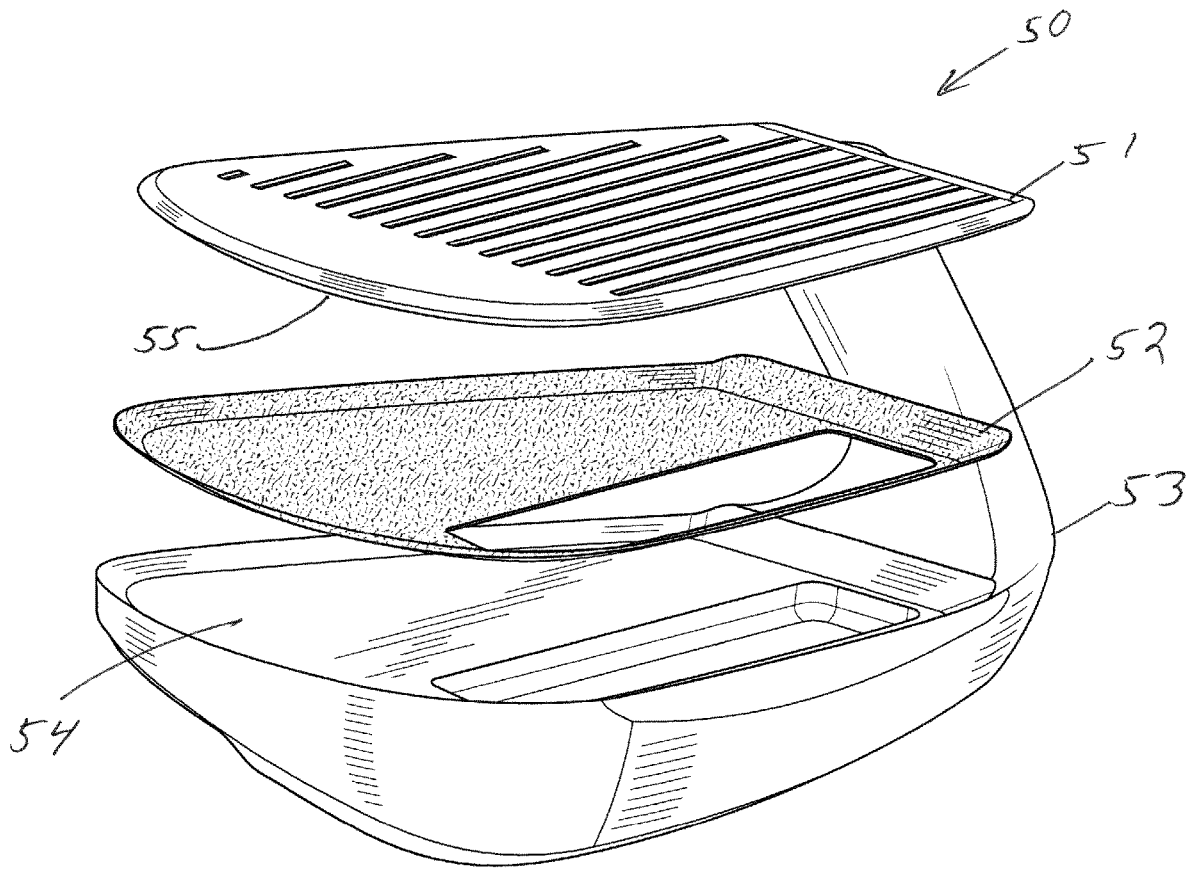
FIG. 4 is an exploded of an iron-type golf club head having components joined by brazing.
Figure 5:
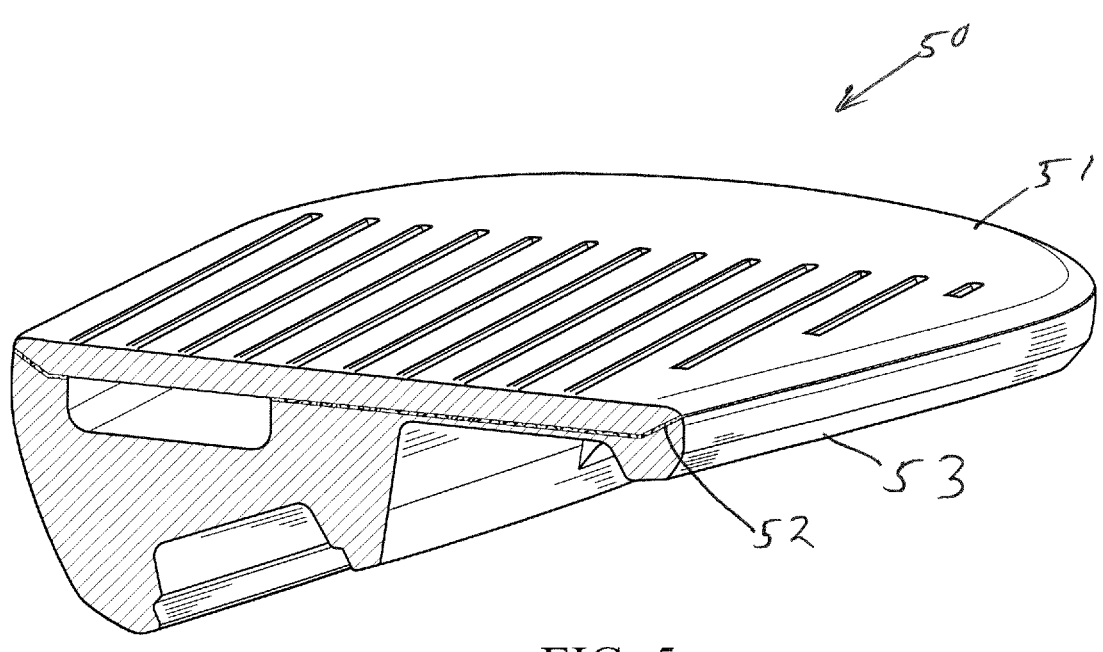
FIG. 5 is a cross-sectional view of an iron-type golf club head with parts joined by brazing.
Figure 6:
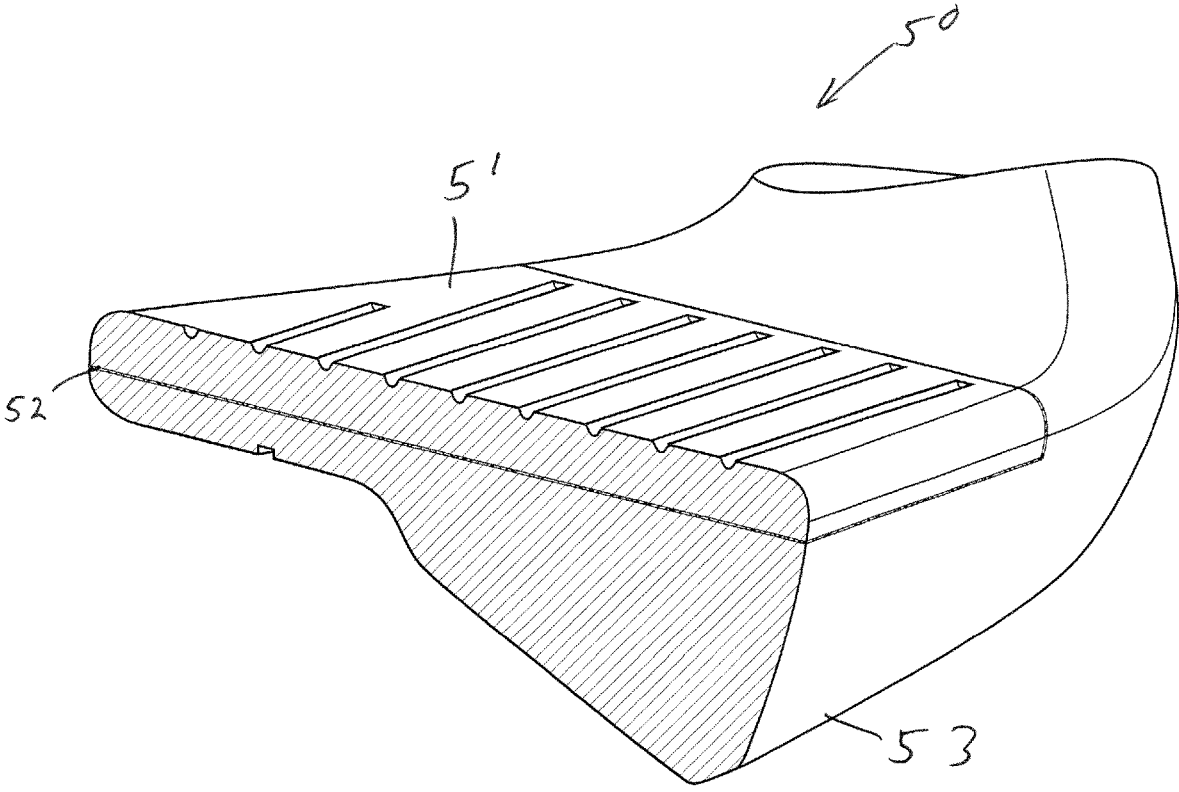
FIG. 6 is a cross-sectional view of an iron-type golf club head with parts joined by brazing.

As shown in FIG. 4, an iron-type golf club head 40 has a first component 51 a brazing material 52 and a second component 53. In this embodiment, the first component 51 is a face insert and the second component 53 is a body of the iron-type golf club head. The second component 53 has an attachment surface 54 and the first component 51 has an attachment surface 55, which in this embodiment is an internal surface of the face insert. The brazing material 52, in a paste form, is applied to one or both of the attachment surfaces 54 and 55. The first component 51 is fixtured within a vacuum brazing furnace, with the attachment surface 55 of the first golf club component 51 facing the brazed material coated attachment surface 54 of the second golf club component 53. A brazing cycle within the vacuum brazing furnace is performed to braze the first component to the second component to form an iron type golf club head as shown in FIGS. 5 and 6.

Figure 7:
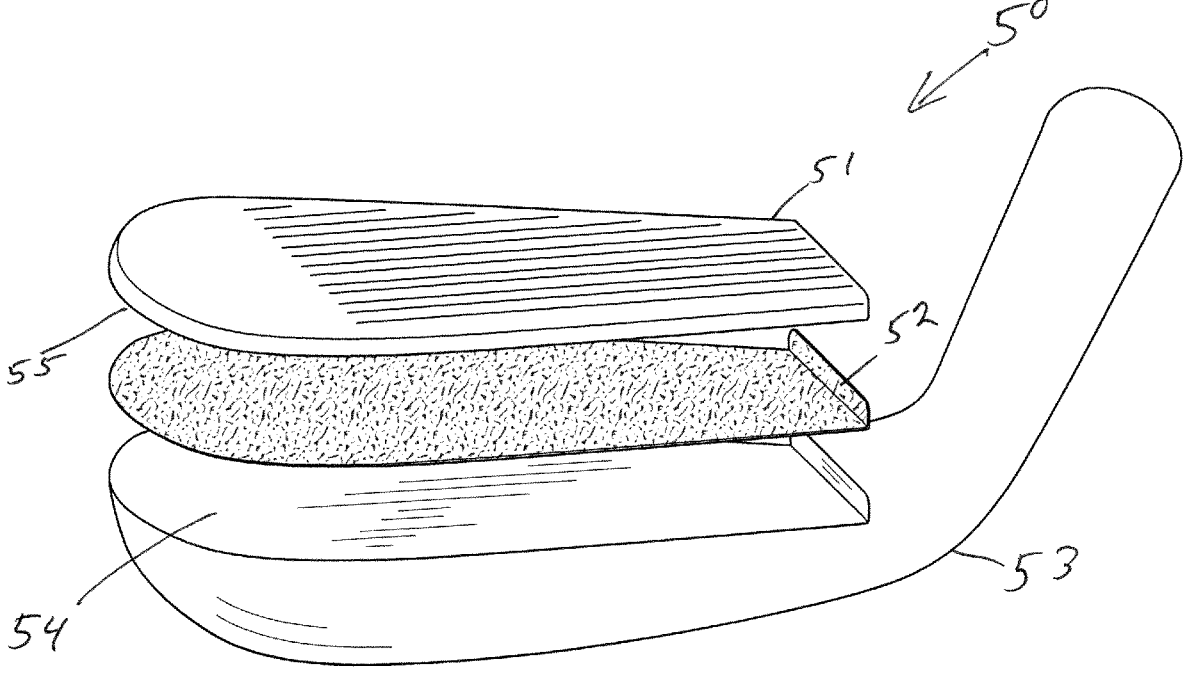
FIG. 7 is an exploded of an iron-type golf club head having components joined by brazing.
Figure 8:
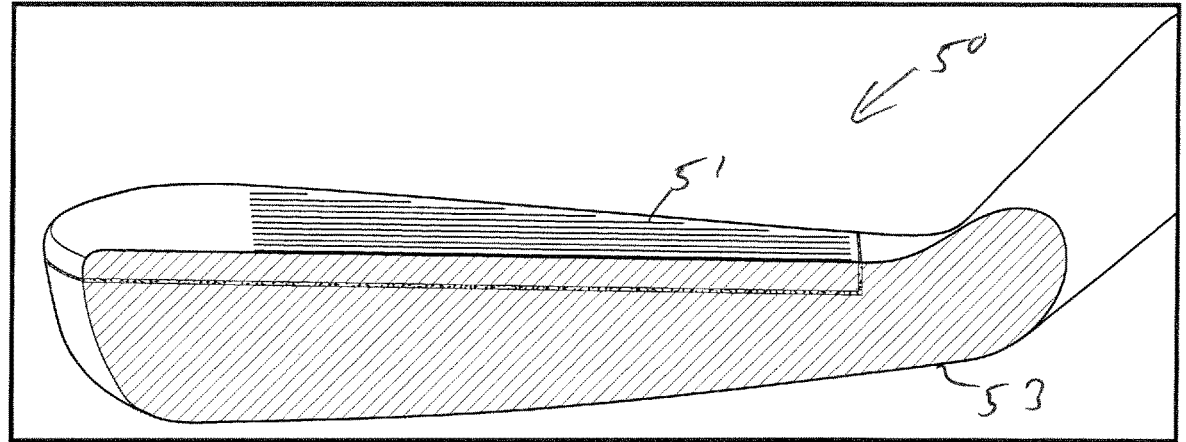
FIG. 8 is a cross-sectional view of an iron-type golf club head with parts joined by brazing.

As shown in FIG. 7, an iron-type golf club head 40 has a first component 51 a brazing material 52 and a second component 53. In this embodiment, the first component 51 is a face insert and the second component 53 is a body of the iron-type golf club head. The second component 53 has an attachment surface 54 and the first component 51 has an attachment surface 55, which in this embodiment is an internal surface of the face insert. The brazing material 52, in a paste form, is applied to one the attachment surface 54. The first component 51 is fixtured within a vacuum brazing furnace, with the attachment surface 55 of the first golf club component 51 facing the brazed material coated attachment surface 54 of the second golf club component 53. A brazing cycle within the vacuum brazing furnace is performed to braze the first component to the second component to form an iron type golf club head as shown in FIG. 8.

Figure 9:
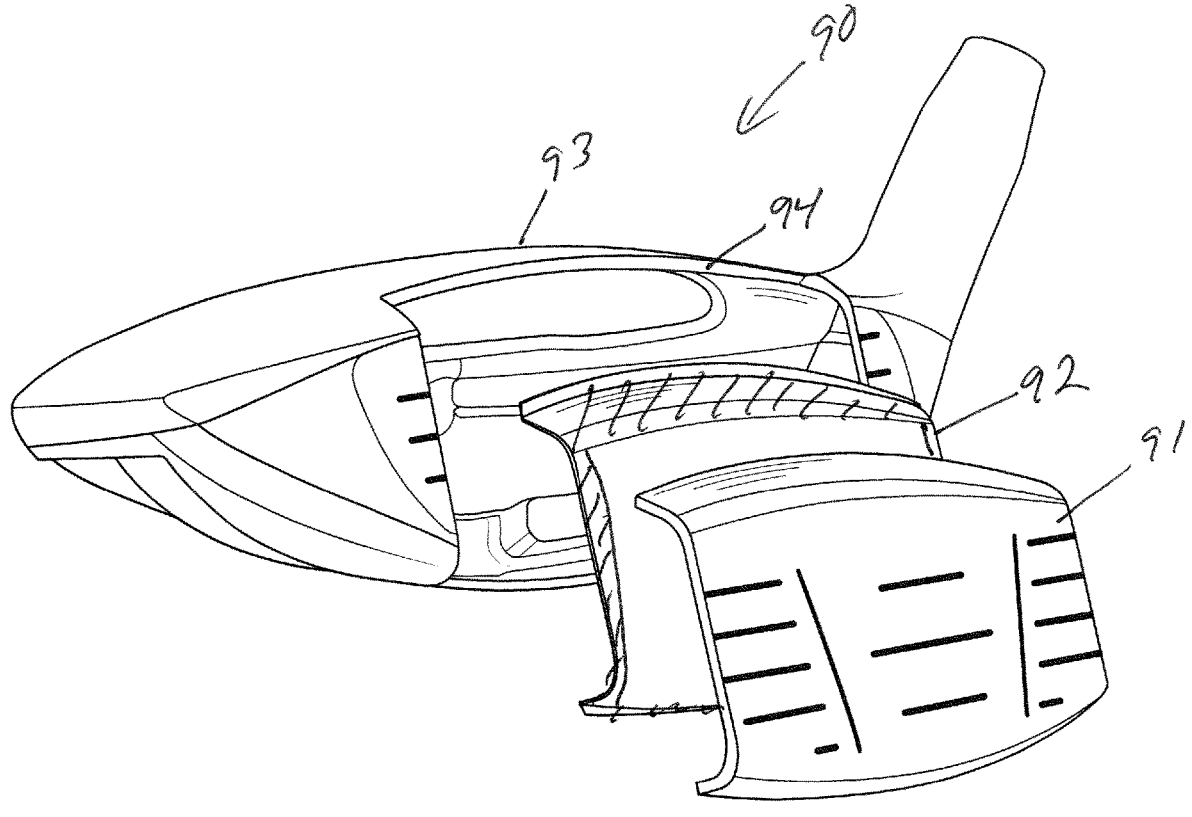
FIG. 9 is an exploded of a wood-type golf club head having components joined by brazing.

As shown in FIG. 9, a wood golf club head 90 has a first component 91 a brazing material 92 and a second component 93. In this embodiment, the first component 91 is a face insert and the second component 93 is a body of the wood-type golf club head 90. The second component 93 has an attachment surface 94 (a perimeter around an opening in the body) and the first component 91 has an attachment surface (now shown), which in this embodiment is an internal surface of the face insert. The brazing material 92, in a paste form, is applied to one the attachment surface 94. The first component 91 is fixtured within a vacuum brazing furnace, with the attachment surface of the first golf club component 91 facing the brazed material coated attachment surface 94 of the second golf club component 93. A brazing cycle within the vacuum brazing furnace is performed to braze the first component to the second component to form an wood-type golf club head.

In a preferred embodiment 5-8 grams, and more preferably 5.5 to 7 grams of the brazing material paste is applied to a surface of the first component or second component to ensure a proper fill. Excess paste is preferably utilized to create a "bead" on the outside of the part that ground away to reveal a final joint (joining of the two components). In a preferred embodiment, 2.5 to 4 grams remain in the part after braze bead removal. A most preferred theoretical mass is only 0.6-0.8 grams of brazing material remaining in the part.

In one embodiment, the first component is a wood-type golf club face component and the second component is a wood-type golf club body component.

In another embodiment, the first component is an iron-type golf club face component and the second component is an iron-type golf club body component.

In another embodiment, the first component is a face component composed of a titanium alloy, and the second component is a body component composed of a steel material.

Aplin et al., U.S. Pat. No. 10,946,255 for Methods Of Manufacturing Golf Club Heads, is hereby incorporated by reference in its entirety.

Seluga et al., U.S. Pat. No. 10,569,146 for a Golf Club Head With Face Dampening And Stress-Reduction Features, is hereby incorporated by reference in its entirety.

Westrum et al., U.S. Pat. No. 11,090,534 for a Golf Club Head Comprising Microscopic Bubble Material, is hereby incorporated by reference in its entirety.

Seluga et al., U.S. Pat. No. 10,213,661 for a Golf Club Head With Tubes Connecting Crown To Elongated Protrusion, is hereby incorporated by reference in its entirety.

Myers et al., U.S. Pat. No. 9,987,527 for an Iron-Type Golf Club Head With Stiffening Rods, is hereby incorporated by reference in its entirety.

Seluga et al., U.S. Pat. No. 10,010,771 for an Iron-Type Golf Club Head With Elevated Weight Bar And Stress-Relieving Structures, is hereby incorporated by reference in its entirety.

Seluga et al., U.S. Pat. No. 10,039,965 for an Iron-Type Golf Club Head With Dampening Features, is hereby incorporated by reference in its entirety.

Ivanova et al., U.S. Pat. No. 9,861,863 for an Iron-Type Golf Club Head With Lightweight Hosel, is hereby incorporated by reference in its entirety.

Westrum, U.S. Pat. No. 9,675,852 for an Iron-Type Golf Club Head, is hereby incorporated by reference in its entirety.

Kim et al., U.S. Pat. No. 9,227,117 for an Adjustable Iron-Type Golf Club Head, is hereby incorporated by reference in its entirety.

Dawson et al., U.S. Pat. No. 9,233,281 for an Iron-Type Golf Club Head, is hereby incorporated by reference in its entirety.

Ivanova et al., U.S. Pat. No. 9,345,937 for an Iron-Type Golf Club Head, is hereby incorporated by reference in its entirety.

Griffin et al., U.S. Pat. No. 9,381,409 for a Multiple Material Iron, is hereby incorporated by reference in its entirety.

Kuhar et al., U.S. Pat. No. 9,381,408 for an Iron-Type Golf Club Head, is hereby incorporated by reference in its entirety.

Dawson et al., U.S. Pat. No. 8,821,313 for an Iron-Type Golf Club Head, is hereby incorporated by reference in its entirety.

Ivanova et al., U.S. Pat. No. 8,911,302 for an Iron-Type Golf Club Head, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

The invention claimed is:

1. A method for joining iron-type golf club head components to form a golf club head, the method comprising:

applying five to eight grams of a copper-based filler material to a first attachment surface of a first component of the golf club head consisting essentially of 6-4 titanium alloy to create a first copper-based filler material attachment surface of the first component of the golf club head, wherein the first component is a face component, and wherein the copper-based filler material is a copper alloy consisting essentially of copper, manganese and nickel;

applying five to eight grams of the copper-based filler material to a second attachment surface of a second component of the golf club head consisting essentially of stainless steel to create a second copper-based filler material attachment surface of the second component of the golf club head, wherein the second component is an iron-type golf club body component;

fixturing, within a vacuum brazing furnace, the first copper-based filler material attachment surface of the first golf club component to face the second copper-based filler material attachment surface of the second golf club component; and performing at least one brazing cycle within the vacuum brazing furnace to braze the first component to the second component, wherein 2.5 to 4 grams of the copper-based filler material remains in the golf club head.

* * * * *